US010196290B2

(12) United States Patent
Ninolakis

(10) Patent No.: US 10,196,290 B2
(45) Date of Patent: Feb. 5, 2019

(54) ELECTROLYTIC TREATMENT METHOD OF OLIVE MILL WASTE WATER

(71) Applicant: Androniki Vestaki, Voula Attkisi (GR)

(72) Inventor: Markos Ninolakis, Voula Attikis (GR)

(73) Assignee: Androniki Vestaki, Voula Attkisi (GR)

( * ) Notice: Subject to any disclaimer, the term of this patent is extended or adjusted under 35 U.S.C. 154(b) by 502 days.

(21) Appl. No.: 14/780,895

(22) PCT Filed: Mar. 27, 2014

(86) PCT No.: PCT/GR2014/000021
§ 371 (c)(1),
(2) Date: Sep. 28, 2015

(87) PCT Pub. No.: WO2014/155141
PCT Pub. Date: Oct. 2, 2014

(65) Prior Publication Data
US 2016/0052813 A1 Feb. 25, 2016

(30) Foreign Application Priority Data
Mar. 28, 2013 (GR) .................................. 130100180

(51) Int. Cl.
*C02F 1/00* (2006.01)
*C02F 9/00* (2006.01)
(Continued)

(52) U.S. Cl.
CPC .............. *C02F 9/00* (2013.01); *B01D 61/025* (2013.01); *B03D 1/245* (2013.01); *C02F 1/004* (2013.01);
(Continued)

(58) Field of Classification Search
USPC ....... 210/634, 638, 639, 641, 642, 650, 651, 210/652, 702, 703, 704, 706, 723, 724,
(Continued)

(56) References Cited

U.S. PATENT DOCUMENTS 6,187,197 B1 * 2/2001 Haddock .............. B01D 61/022
204/542
6,322,701 B1 * 11/2001 Delighiannis ........... C02F 1/705
205/745

FOREIGN PATENT DOCUMENTS

EP 1734013 A2 12/2006

OTHER PUBLICATIONS

C Israilides et al., "Olive Oil Wastewater Treatment with the Use of an Electrolysis System", Bioresource Technology, Aug. 1, 1997, vol. 61, No. 2, pp. 163-170, XP055100865, ISSN: 0960-8524, DOI: 10.1016/S0960-8524(97)00023-0.
(Continued)

*Primary Examiner* — Allison G Fitzsimmons
(74) *Attorney, Agent, or Firm* — Chernoff, Vilhauer, McClung & Stenzel, LLP

(57) ABSTRACT

The invention refers to the electrolytic treatment of olive mill waste water with recovery of the residual oil, removal and valorization of the solids and subsequently to the wet oxidation of oil free waste through electrolytic produced oxidants, the inactivation of the oxidants, the passing of the treated wastewater through activated carbon and their final treatment by the process of reverse osmosis and the recovery of the Sodium Chloride that is recycled, returning in the process of the electrolytic treatment of the oil free olive mill waste water.

20 Claims, 1 Drawing Sheet

(51) Int. Cl.

| | |
|---|---|
| C02F 1/24 | (2006.01) |
| C02F 1/44 | (2006.01) |
| C02F 1/467 | (2006.01) |
| C02F 1/52 | (2006.01) |
| C02F 1/56 | (2006.01) |
| C02F 1/70 | (2006.01) |
| C25B 9/00 | (2006.01) |
| C02F 1/28 | (2006.01) |
| C02F 1/66 | (2006.01) |
| B03D 1/24 | (2006.01) |
| B01D 61/02 | (2006.01) |
| B01D 17/02 | (2006.01) |
| C02F 103/32 | (2006.01) |
| C02F 1/68 | (2006.01) |
| C02F 101/34 | (2006.01) |

(52) U.S. Cl.
CPC ............... *C02F 1/24* (2013.01); *C02F 1/283* (2013.01); *C02F 1/441* (2013.01); *C02F 1/4672* (2013.01); *C02F 1/5236* (2013.01); *C02F 1/56* (2013.01); *C02F 1/66* (2013.01); *C02F 1/70* (2013.01); *C25B 9/00* (2013.01); *B01D 2311/08* (2013.01); *B01D 2311/25* (2013.01); *C02F 1/4674* (2013.01); *C02F 1/68* (2013.01); *C02F 2101/345* (2013.01); *C02F 2103/322* (2013.01); *C02F 2201/4617* (2013.01); *C02F 2209/005* (2013.01); *C02F 2209/04* (2013.01); *C02F 2209/05* (2013.01); *C02F 2209/06* (2013.01); *C02F 2301/046* (2013.01); *C02F 2301/08* (2013.01); *C02F 2303/24* (2013.01)

(58) Field of Classification Search
USPC ............... 210/749, 758, 763, 776, 799, 259
See application file for complete search history.

(56) References Cited

OTHER PUBLICATIONS

Rozzi A et al., "Treatment and Disposal of Olive Mill Effluents", International Biodeterioration and Biodegradation, Jan. 1, 1996, pp. 135-144, Elsevier Ltd., Great Britain, BXP002482350, ISSN: 0964-8305, DOI: 10.1016/S0964-8305(96)00042-X.

* cited by examiner

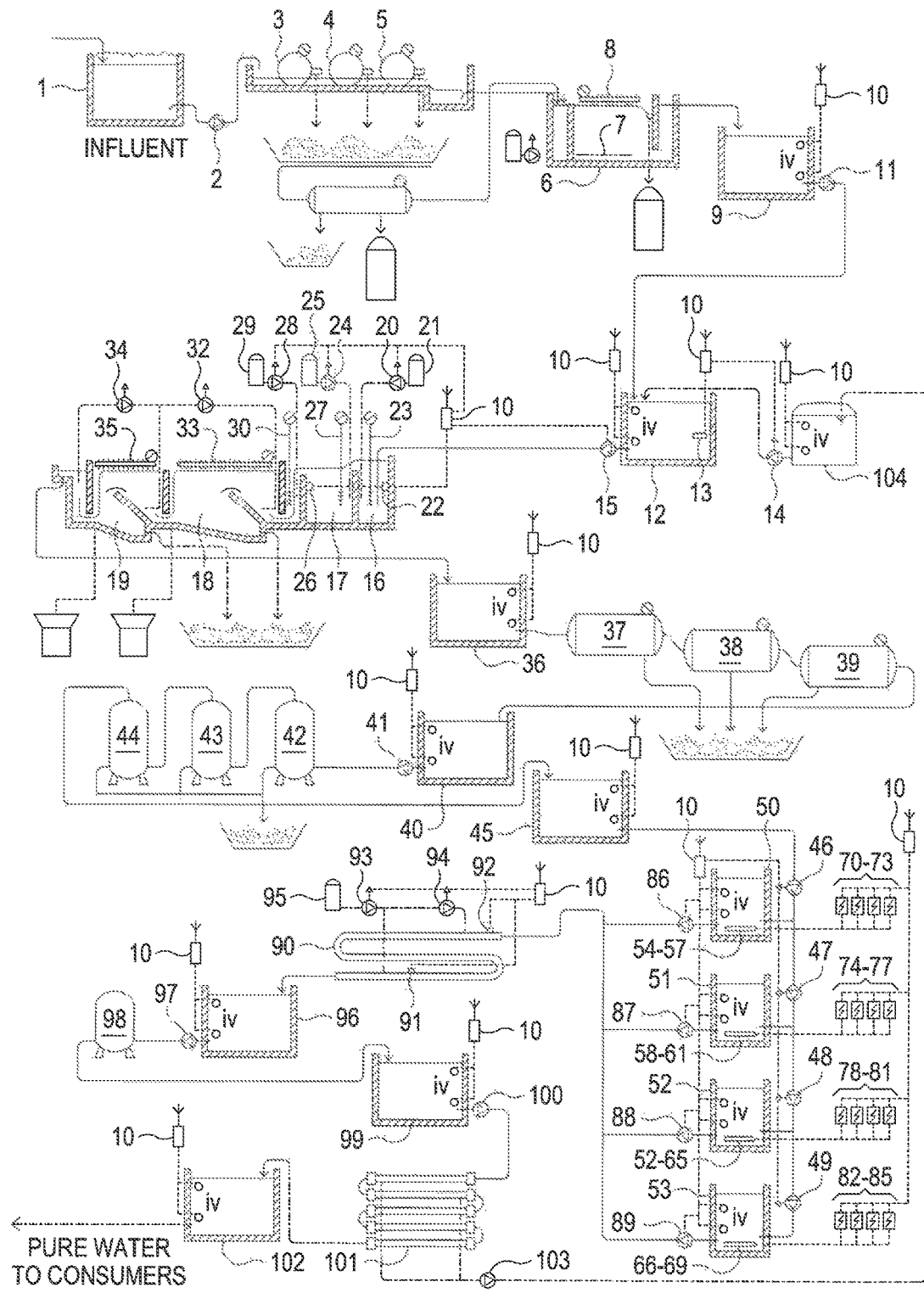

ELECTROLYTIC TREATMENT METHOD OF OLIVE MILL WASTE WATER

This is a national stage application filed under 35 USC 371 based on International Application No. PCT/GR2014/000021 filed Mar. 27, 2014, and claims priority under 35 USC 119 of Greek Patent Application No. GR 20130100180 filed Mar. 28, 2013.

TECHNICAL FIELD

The invention relates to an electrolytic method to treat waste water from olive mills. By pressing the olives for oil production, liquid by-products are generated which rapidly, through fermentation, become waste. During the oil extraction, pomace from broken seeds and olive "pulp" are also produced. Olive Mill Waste Water is a huge environmental problem as it causes damage to the environment, especially for the aquifer, as well as due to the emitted odors which spread within a radius of kilometers, degrades the quality of life of the local residents and also affects the qualitative operation of the tourism industry in the respective region. Due to technical inability to confront the abovementioned liquid waste with the present technologies, therefore inability by the respective authorities to apply the Legislation, the sum of the liquid waste until today, end up in the environment untreated. The present invention solves the environmental and social problem of Olive Mill Waste water with the best, environmentally acceptable and techno-economically efficient manner, promoting green growth.

ADVANTAGES OF THE INVENTION

The electrolytic process to treat waste water from olive mills is a cost-effective and environmentally acceptable treatment method which achieves the removal of the pollutant load of the waste, on the parallel with the recovery of olive oil which residues in the waste, solving the problems created by the uncontrolled discharge of olive mill waste water to the environment.

DESCRIPTION

The olive mill liquid waste is collected into a tank and through pumping, pass through successive self-cleaning stainless steel grids with a gap of 2 mm up to 0.15 mm.

The screenings, which are pieces of kernel and olive pulp, are concentrated and we receive, through centrifugation, the residual olive oil. The solids are forwarded to the pomace composting plant.

Thereafter, the olive mill waste water pass through a flotation unit to collect the residual olive oil. The floatation is assisted by the use of Nitrogen bubbles, with a diameter of 2 up to 50 μm. Nitrogen is used to avoid olive oil oxidation. The residual oil in the waste water has a ratio >1%, w/w.

Subsequently, the oil free olive mill waste water end up in a mixing/allocation tank made of reinforced concrete where they are mixed with a 7% w/w NaCl concentration brine solution, which is deriving from the reverse osmosis unit.

The brine/oil free olive mill waste water solution acquires salinity greater than 3.3% w/w, which is controlled by a PLC that receives indications from a salt meter, and commands a pump to inject brine from the brine storage tank.

Afterwards, the waste water pass through a flotation-clarification unit, for further collection of the residual oil and for the sedimentation of the residual solids that remain in the waste water, achieving their clarification. The solids concentrated in this unit are forwarded for composting.

Then, the oil free waste water passes through successive self cleaning stainless steel SS316L or polyamide filter, with gap from 80 μm up to 1 μm for further retention of suspended solids. The solids, concentrated in the filters, are forwarded for composting.

Afterwards, the brine/oil free olive mill waste ends up in the allocation tank. Then, the solution from the allocation tank is forwarded, based on the PLC program, to the oxidation tanks.

In each tank, the brine/oil free olive mill waste water solution is electrolyzed via innovative electrodes for at least two hours.

After sufficient time of electrolysis, the reduction of $BOD_5$ and COD, the sterilization, deodorization, complete clarification and the destruction of total phenols is achieved.

Afterwards, the treated olive mill waste water pass through the de-oxidation process and is then forwarded to the activated carbon filter.

After passing through the activated carbon filter, the clean water passes through the reverse osmosis, since the discharge of water with high salinity is prohibited and because the purchasing cost of salt is much greater than the reverse osmosis operational cost.

Following the reverse osmosis, purified water ends up in a clean water storage tank and the condensate of the reverse osmosis is stored and returns in the process and specifically in the waste/brine mixing tank.

BRIEF DESCRIPTION OF THE DRAWING

FIG. 1 is a simplified schematic diagram of a water treatment system for carrying out the method described herein.

EXAMPLE 1

30 $m^3$ of olive mill waste is being placed in the tank (1), made of concrete with a coating of polyethylene, with active volume of 40 $m^3$. Through a pump (2) with a flow of 5 $m^3$/hour, they are forwarded in successive self-cleaning grids, type Drum screen, made of SS316 steel, with a gap of 2 mm (3), 0.75 mm (4) and 0.15 mm (5), respectively. The screenings, which are pieces of solid kernel and pulp of olive, are collected and the residual oil (ii) is being recovered by centrifugation (i), while the solids (iii) are forwarded for composting.

Subsequently, the olive mill's waste water enters with natural flow in a floating device, consisted of a 15 $m^3$ tank (6), where the residual oil is being collected (ii). The collection is being assisted by Nitrogen nano bubbles with diameter of 10 μm, which are produced by the passage of Nitrogen through a device, consisted of a compressor and porous ceramic material (7), under the pressure of 2 bars. Nitrogen is used in order to prevent olive oil oxidation. The oil which floats is being removed with a surface scraper (8) and the oil free waste water goes in a tank, with an active volume of 20 $m^3$ (9), made from reinforced concrete, equipped with level gauges (iv) connected to a PLC (10). Through a pump with flow of 5 $m^3$/hour (11), they are promoted in the reinforced concrete mixing/allocation tank, with a volume of 40 $m^3$ (12), equipped with level gauges (iv) connected to a PLC (10). There, the olive free waste water is mixed with 7% NaCl w/w concentration brine, in a ratio of 1 waste water to 1 brine (1/1 w/w), which derives from the brine storage tank (104).

The brine/oil free olive mill waste water solution acquires a 3.5% w/w salinity, which is controlled and adjusted by a PLC (10), that receives indications from a salt meter (13) and commands a pump (14) that transfers brine, of 30 m³/hour flow, to inject brine or not, from the brine storage tank (104).

From the mixing/allocation tank (12), the brine and oil free olive mill waste water solution is forwarded, through a pump with a flow of 10 m³/h (15), in a Direct Air Flotation Flocculation (D.A.F.F.) unit, consisted by four tanks, of which the first three (16,17,18) have an active volume of 2 m³ each and the fourth tank (19), the main (D.A.F.F.) which has a volume of 15 m³ and is divided into two compartments, the first compartment being 10 m³ and the second compartment of 5 m³, which communicate with each other at the bottom of the tank.

Within the first tank (16), with a command from the PLC (10) that receives indications from a pH meter (22), flocculants are added, under slow stirring by a mixer (23), to the brine and oil free olive mill waste water solution flow, through a dosing pump with a flow of up to 250 lit/h (20), from the flocculants storage tank (21), until the pH range drops to 4.

In the second tank (17), with a command from the PLC (10) that receives indications from a pH meter (26), Caustic Soda (NaOH) is added under stirring by a mixer (27) to the brine and oil free olive mill waste water solution flow, through a dosing pump with a flow of up to 250 lit/h (24), from the Caustic Soda storage tank (25), until the pH range is corrected to 7.

In the third lank (18), polyelectrolyte from its storage tank (29), is being injected, under slow stirring by a mixer (30), through a dosing pump with a flow of up to 250 lit/h (28), after a command from the PLC (10) that is connected to a flow meter (31) in the brine and oil free olive mill waste water pump (15) and depending on the conditions, activates the poly/electrolyte injection pump (28), achieving a ratio of net polyelectrolyte inside the brine and oil free olive mill waste water solution of 0.5% w/w. Afterwards, the brine and oil free olive mill waste solution, with natural flow from the first three tanks, enters from the bottom into the fourth tank (19). At the entry point of the waste in tank (19), air (through an air pump), producing nano-bubbles with diameter of 10 µm (32), is inserted. Nano bubbles raise suspended solids to the surface, where they are removed by a surface scraper (33) that ends up at the ⅔ of the length of the tank. At this point, the brine and oil free olive mill waste water solution passes from the bottom of the first to the second compartment of the tank (19), in which air is also inserted, through a second pump that produces nano bubbles with diameter of 10 µm (34). Nano bubbles raise the remaining suspended solids to the surface, where they are removed by a second surface scraper (35). Inside the D.A.F.F. unit clarification and removal of all suspended solids, with size greater than 100 µm, from the brine and oil free olive mill waste water solution is achieved.

Afterwards, the clarified brine and oil free olive oil mill waste water solution ends up in a tank (36), with volume of 10 m³, equipped with level gauges connected to the PLC (10) and by gravity pass through three self-cleaning rotary barrel type filters, made of stainless SS316, with gaps of 80 µm (37), 50 µm (38), 25 µm (39) respectively, and terminate into a shaft with a volume of 5 m³ (40). From there (40), through a multi-stage, 6 bar pressure, 15 m³/h flow pump (41), it passes successively from three pressure filters made of SS316 stainless steel with gaps of 15 µm (42), 5 µm (43) and 1 µm (44), for further retention of suspended solids (iii), which are discharged from the filter and are being sent for composting.

Subsequently, the clarified and filtered brine and oil free olive mill waste solution, enters in a reinforced concrete allocation tank with a volume of 50 m³ (45), which has level gauges (iv) connected to the PLC (10).

From the mixing/allocation tank (45), based on the program of the PLC (10), the solution is forwarded through four pumps, with a flow of 30 m³/hour each, (46), (47), (48), (49), respectively, in four oxidation tanks with active volume of 15 m³ each (50), (51), (52), (53), which have level gauges (iv) connected to the PLC (10).

In each oxidation tank, 10 m³ from the olive mill waste water/brine solution are being forwarded successively within 20 minutes and are being electrolyzed by the electrodes for three hours. The filling-emptying time of each tank, along with the programmed time delay based on commands from the PLC (10), is calculated to 1 hour.

Within the tanks (50), (51), (52), (53), 16 electrodes (54~69), four per tank, of homogeneous alloy of Platinum, Iridium, Rhodium, electrically welded to titanium for the anode and an alloy of Titanium steel 316 Ti for the cathode with a total anode surface for each electrode of 848 cm², have been placed. The electrodes are supported by 16 electronically adjustable rectifiers, AC/DC, 30 Volt—2.000 Amperes, each, (70~85). The rectifiers AC/DC, are connected with the PLC (10), which executes the programmed electrolysis cycle.

The voltage of the direct current D/C applied is 25 Volt, which for these electrodes and the specific concentration of NaCl, 3.5% w/w, yield total intensity on the surface of the electrode's anode of 1.400 Amperes. The intensity of the direct electrical current, D/C, per cm² of anode's surface is 1.65 Ampere.

The wet oxidation of the semi-processed olive mill waste water, is being achieved by the production, during electrolysis, of oxidants as: $O_3$, $Cl^-$, $H_2O_2$, $O^-$, $OH^-$, that act synergistically, resulting in the complete oxidation of the $BOD_5$, the COD and the destruction of phenols into the waste. The start of electrolysis in each tank is being done with a delay of one hour from the previous tank. Electrolysis in each tank has duration of three hours.

Emptying the oxidation tank is being done sequentially within 20 minutes, through four discharge pumps (86-89), with a flow of 30 m³/hour, and the treated waste is lead to a common oxidants' inactivation device, consisted of an 18 m length, 75 mm diameter, and meander pipe (90). The treated water is being de-oxidized by injecting a 40% w/w $Na_2So_3$ solution.

The injection of $Na_2So_3$ from its storage tank (95), is being done based on commands from the PLC (10) which is connected to the Redox meters (91, 92) and activates accordingly the chemical injection pumps (93, 94).

After de-oxidation, the treated water ends up in a tank with active volume of 50 m³ (96), bearing level gauges (iv), connected to the PLC (10), where through a multistage pump (97), with pressure of 4 bar and flow of 30 m³/h, pass through a 10 m³ activated carbon filter (98), ending up in an equalization tank for the reverse osmosis (99), with an active volume of 30 m³, bearing level gauges (iv) connected to the PLC (10).

From the tank with active volume of 30 m³ (99), through a multi-stage high pressure pump 50 bar and 30 m³/hour flow (100), the brine is forwarded to a reverse osmosis unit (101).

After the reverse osmosis, the clean water, which is the 50% of the solution, ends up in the clean water storage tank, with active volume of 30 m³ (102) which has level gauges (iv) connected to the PLC (10).

The remaining 50% that is the condensate of the reverse osmosis and has a concentration of sodium chloride of 7% w/w, ends up in an embedded in the reverse osmosis shaft and is forwarded through a pump, suitable for transferring brine, of 30 m³/hour flow (103), to the brine storage tank, with an active volume of 50 m³ (104), which has level gauges (iv) connected to the PLC (10). From there, the condensate, through a pump of 30 m³/hour flow, suitable for transferring brine (14), is returning, under a command from the PLC (10) in the olive mill waste water treatment process.

The completely treated waste water, from the outlet of the reverse osmosis, has the qualitative characteristics of drinking water.

The invention claimed is:

1. A method of electrolytic treatment of olive mill waste water comprising:
    passing a stream of the olive mill waste water to be treated through a grid at a rate of flow;
    thereafter, subjecting the stream of olive mill waste water to flotation with Nitrogen (N) bubbles, by passing the bubbles through a porous ceramic diffuser device into the stream of olive mill waste water;
    thereafter removing residual oil that floats by using a surface scraper, leaving oil free olive mill waste water;
    thereafter, mixing the oil free olive mill waste water with brine, thereby producing oil free saline olive mill waste water having a predetermined salinity;
    thereafter, passing the oil free saline olive mill waste water through a flotation-clarification unit and progressively injecting chemicals into the oil free saline olive mill waste water, while using a PLC to control the pH and the quantity of the injected chemicals;
    achieving flotation of solids included in the oil free saline olive mill waste water by injecting air bubbles by use of a nano-bubble production pump and a porous ceramic diffuser device;
    removing floating solids by use of a scraper device;
    thereafter, passing the oil free saline olive mill waste water through a self-cleaning filtering unit and then forwarding the oil free saline olive mill waste water for electrolysis by non-sacrificial anode electrode or sacrificial anode electrode, and electrolyzing the oil free saline olive mill waste water with a predetermined minimum intensity of direct current per cm² of anode, for a predetermined period of time;
    thereafter, deoxidizing the electrolyzed oil free saline olive mill waste water within a predetermined period;
    thereafter, passing the oil free saline olive mill waste water through a filter including a volume of activated carbon related to the rate of flow; and
    thereafter, desalinating the oil free saline olive mill waste water in a reverse osmosis unit, and making brine discharge from the reverse osmosis unit available to be mixed with the oil free olive mill waste water in the step of producing oil free saline olive mill waste water.

2. The method of treatment of olive mill waste water of claim 1, wherein the grid has a gap in the range of 2 mm down to 0.15 mm.

3. The method of treatment of olive mill waste water of claim 1, wherein the nitrogen bubbles are nitrogen nano-bubbles formed by the nitrogen passing through the porous ceramic diffuser device, the nano-bubbles having a diameter of 2 μm to 50 μm and entering the stream of olive mill waste water at a pressure of 0.5 bar to 6 bar.

4. The method of treatment of olive mill waste water of claim 1, including flotation and collection of the residual oil in a residual oil flotation tank which has a capacity that is greater than ⅓ of an hourly volume of flow of the stream of olive mill waste water.

5. The method of treatment of olive mill waste water of claim 1, including mixing the oil free olive mill waste water with brine, deriving from the discharge of the reverse osmosis unit, or which has been prepared from water and NaCl, in an amount by w/w in the range of: from 3 parts of waste water to 1 part of brine (3/1), to 1 part of waste water to 5 parts of brine (1/5).

6. The method of treatment of olive mill waste water of claim 1, in which mixing the oil free waste water with brine creates a solution that has a salt (NaCl) concentration of more than 3.3% w/w.

7. The method of treatment of olive mill waste water of claim 1, including passing the oil free saline olive mill waste water through a flotation-clarification unit, Direct Air Flotation Flocculation (DAFF) type consisting of four tanks of which the first three are for the mixing of chemicals and of which each has an active volume greater than one eighth (⅛) of an hourly volume of flow of the stream of olive mill waste water, and of which the fourth tank, which is the main flotation-clarification unit, has an active volume greater than half of the hourly volume of flow of the stream of olive mill waste water and is separated by a wall into a first compartment containing one-third (⅓) of the tank and a second compartment containing two-thirds (⅔) of the tank, the wall allowing communication between the two compartments at the tank's bottom.

8. The method of treatment of olive mill waste water of claim 7, including adding coagulant (PAC) within the first tank of the flotation-clarification unit, under stirring of the oil free saline olive mill waste water, until the pH range is between 3.5 and 4.9, the adding of coagulant being controlled by the PLC, which is connected to a pH meter and to a coagulant injection pump.

9. The method of treatment of olive mill waste water of claim 7, including within the second tank of the flotation-clarification unit, injecting caustic soda (NaOH), while stirring, into the oil free saline olive mill waste water, until the pH range is between 6.5 to 7.5, the injecting of caustic soda being controlled by the PLC, which is connected to a pH meter and to a caustic soda injection pump.

10. The method of treatment of olive mill waste water of claim 7, including, within the third tank of the flotation-clarification unit, injecting a polyelectrolyte solution and stirring, the polyelectrolyte solution having a density within the range from 0.2% w/w to 1% w/w, into the oil free saline olive mill waste water, to reach a final ratio of content of polyelectrolyte solution in the oil free saline olive mill waste water between 0.1% w/w and 1% w/w, the ratio of polyelectrolyte in the oil free saline olive mill waste water being controlled by the PLC, which is connected with a flow meter in a pump that transfers the oil free saline olive mill waste water to the flotation-clarification unit and to a polyelectrolyte injection pump.

11. The method of treatment of olive mill waste water of claim 7, including introducing air, in the form of nano-bubbles whose diameters are in the range from 2 μm to 50 μm with a pressure in the range of 0.5 bar to 6 bar, into the fourth tank of the flotation-clarification unit, at the entry point of the oil free saline olive mill waste water into the fourth tank of the flotation-clarification unit.

12. The method of treatment of olive mill waste water of claim 7, including introducing air, in the form of nano-bubbles whose diameters are in the range from 2 μm to 50 μm, with a pressure in the range of 0.5 bar-to 6 bar, into the oil free saline, olive mill waste water within the second compartment of the fourth tank of the flotation-clarification unit.

13. The method of treatment of olive mill waste water of claim 1, including, after the step of passing the oil free saline olive mill waste water through a flotation-clarification unit, passing the oil free saline olive mill waste water successively through self-cleaning filters having respective gaps in the range from 80 μm to 1 μm.

14. The method of treatment of olive mill waste water of claim 1, including electrolyzing the oil free saline olive mill waste water by a non-sacrificial anode electrode.

15. The method of treatment of olive mill waste water of claim 1, including electrolyzing the oil free saline olive mill waste water by a sacrificial anode electrode.

16. The method of treatment of olive mill waste water of claim 1, including electrolyzing the oil free saline olive mill waste water by:
   an anode electrode comprising a homogeneous alloy consisting of, listed by proportion, of: Platinum (Pt) and Iridium (Ir), or of: Platinum (Pt), Iridium (Ir) and Rhodium (Rd), the electrode having a thickness of from 0.03 mm to 1 mm, the anode electrode having been embedded in a Titanium (Ti) substrate, and
   a cathode consisting of a Titanium stainless steel SS316 Ti alloy.

17. The method of treatment of olive mill waste water of claim 1, wherein the step of electrolyzing includes providing direct electric current (DC) intensity greater than 0.65 Amperes/cm$^2$ of the surface of the non-sacrificial anode, or the sacrificial anode electrode, or an anode which is an alloy of:
   Platinum (Pt) and Iridium (Ir), or of:
   Platinum (Pt), Iridium (Ir) and Rhodium (Rd).

18. The method of treatment of olive mill waste water of claim 1, including electrolyzing the oil free saline olive mill waste water for more than two hours.

19. The method of treatment of olive mill waste water of claim 1, including de-oxidizing the electrolyzed oil free saline olive mill waste water with sodium sulfite ($Na_2SO_3$) less than 30 minutes from the end of its electrolysis.

20. The method of treatment of olive mill waste water of claim 1, including passing the saline olive mill waste water through the activated carbon filter with a maximum hourly flow rate of flow of up to ten times the volume of the activated carbon in the filter.

* * * * *

UNITED STATES PATENT AND TRADEMARK OFFICE
CERTIFICATE OF CORRECTION

| | | |
|---|---|---|
| PATENT NO. | : 10,196,290 B2 | Page 1 of 1 |
| APPLICATION NO. | : 14/780895 | |
| DATED | : February 5, 2019 | |
| INVENTOR(S) | : Markos Ninolakis | |

It is certified that error appears in the above-identified patent and that said Letters Patent is hereby corrected as shown below:

In the Specification

Column 2, Line 4: Delete "polyarnide" and replace with --polyamide--;

Column 3, Line 32: Delete "lank" and replace with --tank--;

Column 3, Line 38: Delete "poly/electrolyte" and replace with --polyelectrolyte--;

Column 3, Line 63: Delete "SS316" and replace with --SS316L--;

Column 3, Line 67: Delete "SS316" and replace with --SS316L--;

In the Claims

Column 5, Line 28 (Claim 1, Line 9): Delete "thereafter removing" and replace with --thereafter, removing--;

Column 6, Line 42 (Claim 9, Line 11): Delete "including within" and replace with --including, within--;

Column 6, Line 64 (Claim 11, Line 3): Delete "50 µm with" and replace with --50 µm, with--;

Column 7, Line 4 (Claim 12, Line 11): Delete "0.5 bar - to 6 bar" and replace with --0.5 bar to 6 bar--; and Column 7, Line 5 (Claim 12, Line 11): Delete "saline, olive" and replace with --saline olive--.

Signed and Sealed this
Sixteenth Day of April, 2019

Andrei Iancu
*Director of the United States Patent and Trademark Office*